United States Patent [19]

Swars

[11] Patent Number: 5,230,382
[45] Date of Patent: Jul. 27, 1993

[54] PROCESS OF PRODUCING INDIVIDUAL ECCENTRIC CAMS FROM CAST METAL

[75] Inventor: Helmut Swars, Bergisch Galdbach, Fed. Rep. of Germany

[73] Assignee: Emitec Gesellschaft fur Emissionstechnologie mbH, Lohmar, Fed. Rep. of Germany

[21] Appl. No.: 869,656

[22] Filed: Apr. 16, 1992

Related U.S. Application Data

[63] Continuation-in-part of Ser. No. 422,765, Oct. 17, 1989, abandoned.

[30] Foreign Application Priority Data

Oct. 25, 1988 [DE] Fed. Rep. of Germany ....... 3836328

[51] Int. Cl.$^5$ ................. B22D 11/126; B22D 11/00
[52] U.S. Cl. ................. 164/477; 164/460; 164/418

[58] Field of Search ............... 164/418, 459, 460, 461, 164/477

[56] References Cited

U.S. PATENT DOCUMENTS

4,209,057  6/1980  Tkachev .................. 164/493

FOREIGN PATENT DOCUMENTS

1482761  5/1989  U.S.S.R. ................... 164/98

Primary Examiner—Richard K. Seidel
Assistant Examiner—Rex E. Pelto
Attorney, Agent, or Firm—Anderson Kill Olick & Oshinsky

[57] ABSTRACT

A process for producing individual eccentric cams of cast material for assembled camshafts, in which a bar having the cross-section of a cam is produced by continuous casting and where individual cams are separated from the solidified bar.

12 Claims, 1 Drawing Sheet

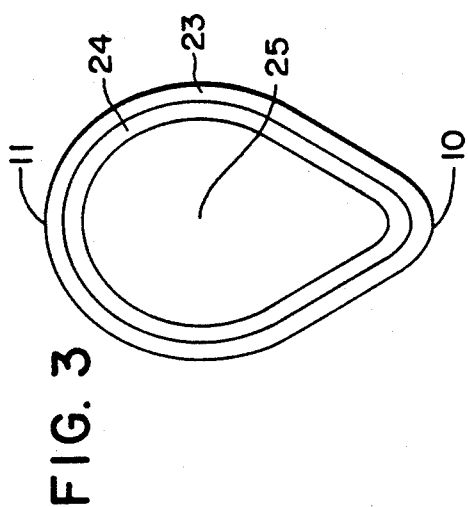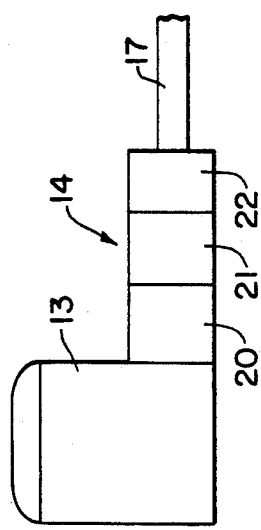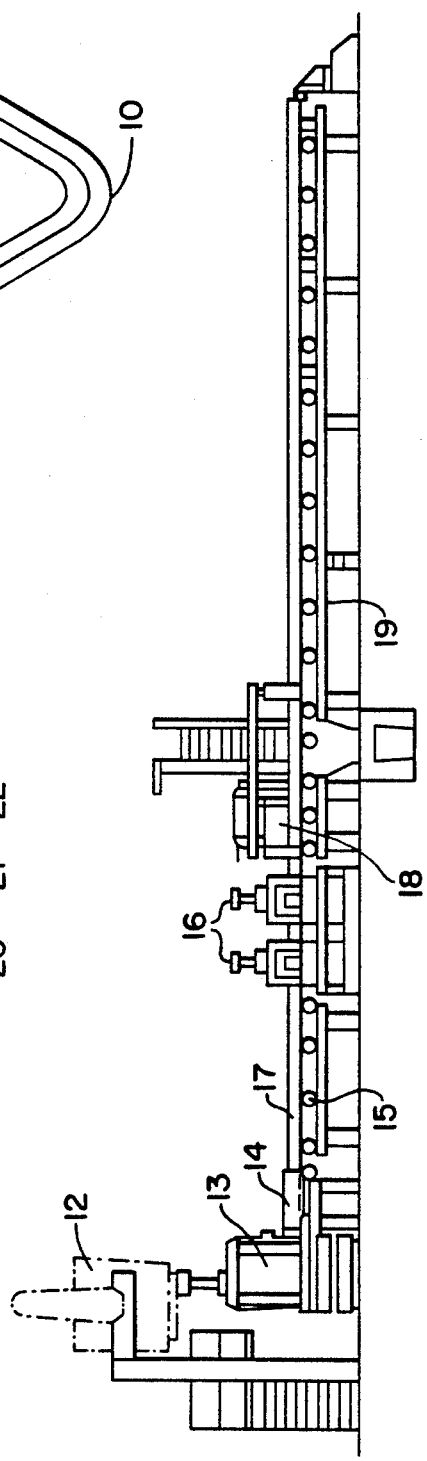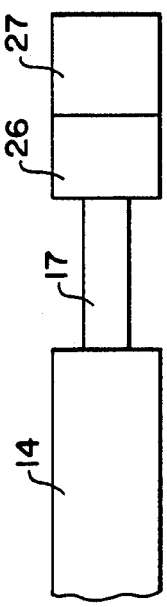

PROCESS OF PRODUCING INDIVIDUAL ECCENTRIC CAMS FROM CAST METAL

CROSS-REFERENCE TO RELATED APPLICATION

This application is a continuation-in-part of application Ser. No. 07/422,765, filed Oct. 17, 1989 now abandoned.

BACKGROUND OF THE INVENTION

1. FIELD OF THE INVENTION

The invention relates to a process for producing individual cams from cast material for incorporation into assembled camshafts.

2. DESCRIPTION OF THE PRIOR ART

Assembled camshafts of the type in which tubes form the basic shaft member are advantageous from the point of view of weight. Steel cams, irrespective of the method used to fix them to the tube, e.g. shrinking, hydraulic deformation of the tube, or other methods, do not cause any fixing problems. However, as a rule, their tribological properties are not the most favorable for certain cam followers, e.g. bucket tappets or rocker arms, irrespective of the material from which the latter are formed. On the other hand, cast cams have good running characteristics, especially if they are provided with a hard, wear-resistant surface layer, but because of the risk of cracking they cause problems when being fixed to a tube. In particular, this is so with cams made of chilled cast iron with a ledeburitic surface layer which is too brittle for hydraulic expansion so that the cams burst during plastic deformation.

Cams made of malleable cast iron with a ledeburitic surface layer produced by remelting hardening are more suitable, but the process involved is complicated and expensive so that the production cost of the cams is too high.

Cast cams with an elongatable structure, such as malleable cast iron or spheroidal graphite cast iron subjected to induction surface hardening, are acceptable from a cost point of view. However, after hardening such cams only have a martensitic surface whose tribological properties are not as good as those of a ledeburitic surface.

SUMMARY OF THE INVENTION

Accordingly, it is an object of the present invention to provide a process for producing individual cams of a cast material which is cost-effective as compared with prior art processes and which produces cams with good tribological properties suitable for use in assembled cam shafts.

Pursuant to this object, we provide a process for producing individual cams from cast material for assembled camshafts, which includes the steps of:

continuously casting a ferrous alloy to form a bar having a cross-section of a cam;

controlling the composition of the alloy, the casting temperature and the cooling of the bar to provide the bar with a core of spheroidal graphite cast iron and a hard surface layer of chilled cast iron with a ledeburitic structure; and separating individual cams from the bar when it is solidified.

Such a process requires relatively low investment and is capable of producing individual cams of a uniform quality at a high production speed and relatively low cost. The continuous casting process is carried out in a plant in which the mold die corresponds to the profile of the finished cam, taking into account a slight grinding allowance, and where the temperature of the mold die, which is cooled, is such that a ledeburitic surface layer is produced. The resulting bar is separated into required lengths which are then cut into individual cams in widths as required, the cams being ground after having been joined to the camshaft tube.

Preferably, the bar is cast with the point of the cam profile pointing downwardly. Then, the action of gravity on the bar causes the point of the cam to remain in contact with the cooled dies which form it as the bar shrinks and thus, the process ensures that the point has the desired chill cast properties to withstand the large forces encountered in use.

In another embodiment of the invention, the bar, as it emerges from the forming mold, is cooled until the outer surface layer is doughy, and then the bar is moved through a container of powdered alloying elements which may be sintered and rolled or pressed onto the surface. This enables the composition of the outer surface to be enhanced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a side elevation of a plant for carrying out the process of the invention;

FIG. 2 is a diagram illustrating the parts of the mold assembly;

FIG. 3 is a diagram of a cam showing its metallic structure; and

FIG. 4 is a diagram illustrating a modification of the plant of Figure 1.

DESCRIPTION OF THE PREFERRED EMBODIMENTS

Referring first to FIG. 1, this shows a plant for the horizontal continuous casting of bar having a cross-section of a cam as shown diagrammatically in FIG. 3. The cam has a point 10 and a rounded back 11.

The plant of FIG. 1 comprises a ladle 12 to hold the casting metal, a tundish 13 to receive the molten metal from the ladle 12, a mold assembly 14, a roller table 15, means 16 for withdrawing the continuously cast bar 17 from the mold assembly, means 18 for separating the cast bar 17 into lengths of 30 to 50 cm, and a roller table 19 to receive the separated lengths.

The metal which is used to form the cams is a spheroidal cast iron of chill-cast quality having a composition within the following percentage ranges by weight:

| | |
|---|---|
| Carbon | 3.0–4.3 |
| Silicon | 2.0–3.0 |
| Manganese | 0.1–1.2 |
| Phosphorous | 0.03–0.12 |
| Sulphur | nil–0.35 |
| Magnesium | 0.04–0.08 |
| Nickel | 0.005–0.01 |
| Molybdenum | nil–5.0 |
| Chromium | nil–1.25 |

| -continued |  |
|---|---|
| Tellurium | 0.005–0.01 |
| Vanadium | nil–0.8 |
| Tin | nil–1.75 |
| Copper | nil–2.5 |

Homogeneity of the melt in the tundish 13 is achieved by magnesium inoculation by any one of a number of known processes. For example, metallic magnesium may be introduced with the tundish under pressure, or may be introduced in the form of wire. In another method, the magnesium may be added in a pre-alloyed form, for example, by the Oestberg Process in which the pre-alloy is added by a multiple-arm conveyor which submerges in the molten metal in the tundish.

The mold assembly 14 is connected directly to the tundish 13 and includes a graphite die 20 to receive the metal from the tundish 13 followed by a water-cooled, graphite-coated steel die 21 followed by a water-cooled copper die 22 as shown diagrammatically in FIG. 2.

The mold assembly 14 and the dies 20–22 are arranged so that the point 10 of the cam profile is pointing downwardly. This is to ensure that the area around the point of the cam profile remains in contact with tue cooled dies 21 and 22 for as long as possible. The cast bar shrinks as it passes through the mold assembly and lifts away from the die surfaces so that an insulating air gap is formed between the die walls and the bar. The degree of shrinkage may be on the order of 5 to 6%. However, the action of gravity keeps the point area 10 against the cooled part of the mold assembly during this shrinkage and ensures that the point area of the bar, and thus of the finished cam, has the desired chill-cast properties.

The casting temperature is between 1140 and 1200 degrees C. and the cooling rate of the cast bar is between 1 and 10 degrees C. per second.

The speed of withdrawal of the cast bar 17 from the mold assembly 14 is on average between 600 and 1000 mm per minute although the withdrawal is intermittent rather than continuous by the withdrawal means 16.

The cast bar is separated into lengths of 30 to 50 cm by the means 18 by grinding and breaking. The bar is then divided into individual cams by any suitable conventional means such as water jet cutting using abrasives, wire cutting using thin (0.05 mm) wire covered with diamond chips or foil cutting in which a thin foil is wound round the cam to be separated. In another method, separation may be effected by a fusion cutting process generating high temperatures at extremely high cutting speeds. The individual cams may have a width of about 16 to 24 mm.

The metallic structure of a cam made by the above process is shown diagramatically in FIG. 3. Thus, there is a surface layer 23 having a thickness of between 1.5 and 5 mm, preferably between 2.5 and 3 mm. This surface layer 23 has a ledeburitic structure with cementite irradiation and special carbides in an amount of at least 40%. The graphite content of this layer 23 is no greater than 10%. Preferably, the surface layer has a hardness of at least 48 HRC.

Within the outer layer 23 is a transition region 24 with, towards the core 25 of the cam, an increasing ferritic-pearlitic percentage and an increasing percentage of graphite but decreasing percentages of cementite and special carbides. This region has a thickness of between 2 and 5 mm.

The core 25 of the cam has to be machinable since it has to be bored to take the shaft tube and is therefore pearlitic with a high proportion of spherolite and a low percentage of cementite.

For the purpose of producing a connection between the cams and the tube by hydraulic expansion of the tube, it is particularly advantageous to use individual cams produced in accordance with the invention in which the core has a yield point of at least 500 M/mm$^2$ and an elongation at rupture of at least 12%.

The cams are produced from bars which, relative to the finished cams, have only a slight grinding allowance of about 0.5 mm. Machining operations are thus reduced to a minimum.

The ledeburitic surface layer comprising a high content of hard mixed carbides provides the cams with a very high wear resistance which does not adversely affect the deformability of the core thus enabling the cam to be hydraulically attached to the tube by expansion of the latter.

In a further embodiment of the invention shown in FIG. 4, the bar 17, after emerging from the mold assembly 14 where the cast material is cooled to such an extent that a doughy outer skin is formed on the bar, is guided through a hopper 26 containing powdered alloying elements which combine with the material of the surface layer to produce an alloyed layer on the surface of the bar.

The alloying materials in this case may be selected from the carbide-forming agents manganese, chromium, silicon, tungsten, vanadium, molybdenum, titanium, nickel, tantalum, niobium and carbon.

In another embodiment, a further die 27 is provided adjoining the hopper 26 containing the powdered alloying elements and is heated so that the powder adhering to the bar is fused onto the surface to form an alloy.

The heated die 27 may be replaced by a drawing ring and/or a roller assembly in which, during subsequent compression, the alloy layer is sintered onto the surface and compressed.

While the invention has been illustrated and described as embodied in a process for producing individual cams of cast material, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A process for producing individual eccentric cams from cast material for assembled camshafts, comprising the steps of:
   continuously casting a ferrous alloy to form a bar having a cross-section of a cam;
   controlling alloy composition, casting temperature and cooling of the bar to provide the bar with a core of spheroidal graphite cast iron and a hard surface layer of chilled cast iron with a ledeburitic structure; and
   separating individual cams from the bar when it is solidified.

2. A process according to claim 1, wherein the controlling step includes controlling the composition of said ferrous alloy and continuous casting process parameters so that said core is a material with a yield point of at least 500N/mm$^2$ and an elongation at rupture of at least 12%.

3. A process according to claim 1, wherein the controlling step includes controlling the composition of said ferrous alloy and continuous casting parameters so that said surface layer of said chilled cast iron has a hardness of at least 48 HRC.

4. A process according to claim 3, wherein said surface layer has a thickness of between 1.5 and 5 mm.

5. A process according to claim 4, wherein said surface layer has a thickness of between 2.5 and 3 mm.

6. A process according to claim 1, wherein the controlling step includes controlling continuous casting process parameters so that a transition region is provided between said hard surface layer and said core.

7. A process according to claim 6, wherein said transition region has a thickness of between 2 and 5 mm.

8. A process according to claim 1, wherein said casting step includes producing the bar with a grinding allowance of about 0.5 mm thickness relative to a finished cam.

9. A process according to claim 1, wherein said separating step includes separating the bar into lengths from which a plurality of cams may be produced and then cutting the individual cams from said lengths to a finish cam width dimension.

10. A process according to claim 1, wherein the cam cross-section has a point and a rounded back and wherein the bar is continuously cast horizontally with the point of the cam directed downwardly.

11. A process according to claim 1, wherein said continuous casting includes entering the bar into a molding assembly in which said core and hard surface layer are formed, then, while said surface layer is in a doughy condition, moving the bar through powdered alloying elements and subsequently moving the bar through a heated die to sinter the powdered alloying elements to form an alloy with the hard surface layer.

12. A process according to claim 11, and further comprising the step of pressing the sintered-on alloying elements by rolling.

* * * * *